April 8, 1958
J. A. WIORA
2,829,917
BATTERY LIFTING DEVICE
Filed May 9, 1956
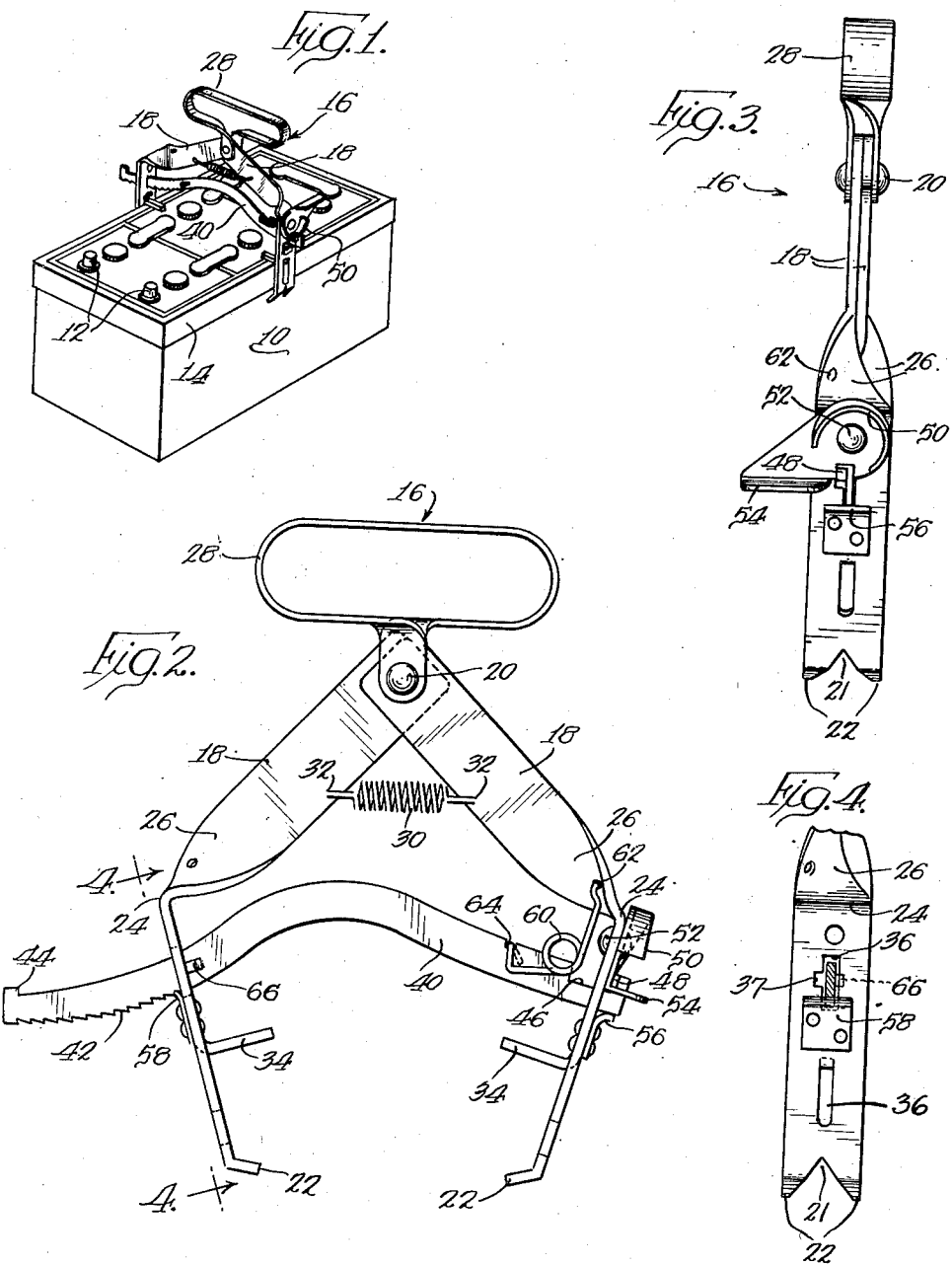
INVENTOR.
Joseph A. Wiora
BY
Ahlberg, Wupper & Gradolph
Attys:

United States Patent Office 2,829,917
Patented Apr. 8, 1958

2,829,917
BATTERY LIFTING DEVICE

Joseph A. Wiora, Almond, Wis., assignor to Wiora Products Corporation, Almond, Wis., a corporation of Wisconsin Application May 9, 1956, Serial No. 583,687

4 Claims. (Cl. 294—90)

The present invention relates to lifting devices and more particularly to a mechanic's tool which is especially adapted for the purpose of lifting storage batteries out of automobiles or the like and for handling such batteries in a convenient and safe manner. It will be appreciated that a lifting device of this character also has other generally similar uses with or without minor modifications, depending upon the particular lifting application.

One of the objects of the present invention is to provide a novel battery lifter of universal application which is adapted for use with all known types of automobile and similar storage batteries, without regard to the location of the battery terminals or the size or shape of the battery case.

Still another object is to provide an improved device of this character which is easily attached to and removed from a battery and which can be locked solidly to the battery so as to prevent any possibility of the battery becoming detached from the tool.

Yet another object is to provide a novel device of this general character which can be manufactured at relatively low cost, which is safe and extremely convenient in use, and which will have a long service life.

Other objects and advantages will become apparent from the following description of a preferred embodiment of my invention.

In the drawings, in which similar characters of reference refer to similar parts throughout the several views, Fig. 1 is a perspective view of a typical automobile or similar type battery shown with a lifting tool which embodies the features of my invention attached thereto;

Fig. 2 is a front view of the lifter of the present invention;

Fig. 3 is a side view thereof taken from the right of Fig. 2; and

Fig. 4 is a fractional view partly in section which may be considered as taken substantially along the line 4—4 of Fig. 2 in the direction indicated by the arrows.

Automobile batteries of the three cell, six-volt type almost always are arranged with the output terminals at diagonally opposite corners and most battery lifters in use depend for their utility upon direct attachment to these terminals. As an example of such a carrier which has received extensive use, see may earlier Patent No. 2,224,561. Twelve-volt batteries are now largely replacing six-volt batteries in automobiles and the cell arrangement in all instances with which I am familiar results in the terminals being so located that any lifting attachment to the terminals results in an unbalanced condition of the load with respect to the tool. This may be seen in Fig. 1 where a twelve-volt automobile battery of one commonly used type is indicated at 10, with the output terminals 12 both appearing at one end of the battery. Other typical cell arrangements result in the terminals being located at one side and at opposite ends. In any event, the tool of the present invention is so arranged that it attaches directly to the battery case and can be clamped tightly thereto, so that even though the battery case does not have the usual rim 14 there is no danger of the lifter and battery becoming disconnected. The tool is therefore of universal application.

The lifter indicated generally by the numeral 16 is formed very largely of steel strip stock which is sheared and bent to produce the principal elements. Referring particularly to Fig. 2, there is a side tong member 18 formed of a strip of steel an inch or so wide, the lower end of which is notched as at 21 with the sharp tips thus formed being bent inwardly as at 22 to form hooks which are adapted, as will be explained presently, to dig very slightly into the battery case to form a firm attachment therewith. A pad or other attaching element at the lower end of the member 18 can of course be substituted if desired.

At a distance of three and one-half inches or so, above the hooks 22, the strip of metal is bent inwardly at an angle of approximately 45° or so as at 24 and above this bend is twisted through 90° as indicated at 26 so that two of these tong members, which may be exactly alike, can be pivoted together at their upper ends by a rivet 20 which also attaches a loop type handle 28. For convenience in description the tong members 18 will be referred to as the right or left tong members as these elements are oriented in Fig. 2.

A tension coil spring 30 has its bent ends hooked through small holes 32 in the members 18. These holes are spaced downwardly from the pivot 20 appreciably so that the action of this spring is to swing the hooks 22 toward each other in the absence of any restraining action.

A matter of an inch and a half or so above the hooks 22, the metal of the tong members 18 is slit to form a tang 34 which is bent straight inwardly. As is best seen in Fig. 1, they act as stops to prevent the tool from being inserted downwardly over a battery case farther than is desirable.

At a position half way or so between the stop 34 and the bend 24, each side member is provided with a vertically oriented rectangular hole 36 which has a small rectangular notch 37 at one side for a purpose to be explained presently. A combined spreading and clamping cross bar 40 extends through the holes or slots 36 and at its left hand end as seen in Fig. 2 is provided on its lower edge with a plurality of ratchet teeth 42 which are pitched toward the right. On its upper edge at this end, the cross bar 40 has a small tab 44 which serves as a stop to prevent this end of the cross member from accidentally sliding through the slot 36 in the left hand tong member 18 when the clamping jaws are spread.

Near its opposite (right hand) end the cross bar 40 has a rectangular notched out section 46 removed from the upper edge and near the extreme end of the notch thus formed a piece of the metal is bent to one side as at 48 to form an extensive bearing area for engagement by the edge of a spiral cam 50. This cam is pivoted at its center of rotation by a rivet 52 passed through the tong member 18 just below the bend 24.

The cam 50 has a wing extension 54 at one side which is adapted for engagement by the finger of an operator so that the cam 50 can be easily rotated. During clockwise rotation, engagement of its wedgelike surface with the cam follower 48 draws the cross member 40 to the right with respect to the right hand tong member 18. In order to insure that this action does not also simultaneously tend to raise the left hand end of the cross member, an abutment 56, formed of a small piece of bent metal, is riveted to the side of the tong member 18 in a position below the right hand end of the cross member 40 in such position that its upper end engages the bottom edge of the cross member 40 at a position somewhat outwardly of the face of the tong member 18.

At the opposite side of the device a small clip 58 is similarly riveted to the side member 18 in a position below the cross member 14 and this clip has its upper edge formed to engage the ratchet teeth 42 when the left hand end of the cross member 40 is in the down position. The slot 36 is long enough so that when the left hand end of the cross member 40 is lifted as far as it will go, the ratchet teeth 42 clear the top edge of the clip 58.

A grasshopper type spring 60 has one end passed through a hole 62 in the member 18 at the right hand side of the device just above the bend 24, while the opposite end of this spring is shaped to hook into a notch 64 in the top edge of the cross member 40 at a point sufficiently away from the right hand side member 18 so that the action of this spring in expanding exerts a component upon the cross member 40 which is downward and also toward the left. Thus, the cross member 40 is always urged downwardly while the cam following surface 48 is always held against the cam 50.

Closing action of the tongs is limited by a small tab 66 struck outwardly from the metal of the cross-member 40 at an appropriate spot to bear against the inside surface of the left hand tong member 18 when the spacing between the hooks 22 is the minimum desired. When this action occurs, the balance as between the springs 60 and 30 is such that the spring 60 overrules any tendency of the spring 30 to urge the cross-member 40 to the right with respect to the right hand side member 18. Thus, the cam follower 48 is not moved away from the cam 50 by action of the spring 30 when the left hand side member 18 engages the slot 66.

The intermediate portion of the cross member 40 is bowed upwardly as shown, as that when the device is in use there will be no danger of this cross bar touching the battery intercell connectors nor the caps for the filling openings. Furthermore, this curvature also makes the device somewhat easier to use as will appear presently.

The small notch 37 previously mentioned, at one side edge of the slot 36, is to permit the passage of the tab 66 when the device is assembled by passing the cross member 40 through the slot 36 in the right hand tong member 18 and thence through the similar slot in the left hand member. Inasmuch as the tong members 18 are reversed from right to left with respect to each other, it will be apparent that both members 18 can be formed, if desired, with the clearance notch 37, since at the left hand side of the device the notch will be present at the side of the cross member 40 opposite from the struck out slot 66.

Preferably, the ratchet engaging member 58 and the bearing abutment member 56 should be formed of hardened steel, while the cross member 40 and the cam 50 should be case hardened so as to prevent excessive wear. The remaining elements (excepting the springs) may be made of mild steel.

The device is used in the following fashion: It is grasped in the hand so that the palm of the hand is placed against the upwardly slanting portion of the right hand tong member 18 with the fingers hooked under the cross bar 40. With a slight squeezing action, the left hand end of the cross member 40 is raised so as to disengage the ratchet teeth 42. Additional squeezing pressure causes the upper surface of the cross member 40 to engage the top of the slot 36 of the left hand tong 18, and since this point of engagement is considerably offset to the left of the pivot 20 and the bar 40 slopes downwardly in the vicinity of engagement, the left hand tong 18 is swung outwardly until the stop 44 engages the outside surface of the left tong member.

With the device held in this position it is lowered over a battery until the stops 34 come against the top surface of the battery case. The squeezing pressure is then relaxed so that the spring 30 swings the tongs toward each other until the engaging elements 22 are brought against the side walls of the battery case. As the squeezing pressure continues to be relaxed, the spring 60 acts to swing the left hand end of the cross member 40 downwardly until the ratchet teeth 42 engage the detent 58. The cam wing extension 54 is then grasped and turned until the cam 50 draws the right hand end of the cross member 40 to the right with respect to the right hand tong 18 sufficiently to tightly engage the teeth 22 in the battery case. The handle 28 can then be used to lift the tool and the battery as a single locked together rigid unit.

To disengage the battery, the cam 50 is simply rotated so as to relax the pressure of the teeth 22 on the battery case. Then the right hand tong 18 and cross member 40 are grasped and squeezed as previously described so as to lift the ratchet teeth 42 away from the engaging member 58 and to spread the tongs, after which the tool is lifted upwardly leaving the battery in place.

From the above description of a preferred embodiment of my invention, it will be appreciated that the dimensions and other details recited are for the purpose of definiteness in describing a representative embodiment of the invention and are not intended to be limitative, and that changes and modifications can be made in the structure shown and described without departing from the invention, and that therefore the scope of the invention is to be measured by the scope of the accompanying claims.

Having discussed my invention, what I claim as new and useful and desire to secure by Letters Patent of the United States is:

1. In a grasping and lifting device, means forming a pair of hinged together tong elements, means connected between said elements for biasing said elements toward each other, a combined spreading and clamping member extending transversely between said tong elements, cam means on one of said tong elements acting against said spreading and clamping member for drawing said spreading and clamping member toward said one of said tong elements, said spreading and clamping member extending loosely through and beyond the other tong element, said spreading and clamping member having ratchet teeth on the lower edge thereof for engagement with said other tong element when said spreading and clamping member is urged downwardly, said spreading and clamping member when lifted acting upwardly and outwardly against said other tong element to cam said tong elements apart, and means acting between said spreading and clamping member and one of said tong elements to urge said spreading and clamping member downwardly and toward said other tong element and into engagement with said cam means.

2. In a grasping and lifting device, means forming a pair of hinged together tong elements and a handle connected to said elements, means connected between said elements for biasing said elements toward each other, a combined spreading and clamping member extending transversely between said tong elements, means on one of said tong elements acting against said spreading and clamping member for drawing said spreading and clamping member longitudinally toward said one tong element, said spreading and clamping member extending beyond the other tong element, said spreading and clamping member having ratchet teeth on one edge thereof for engagement with said other tong element when said spreading and clamping member is urged in one transverse direction, said spreading and clamping member when urged in the opposite transverse direction acting outwardly against said other tong element to cam said tong elements apart, and means acting between said spreading and clamping member and one of said tong elements to urge said spreading and clamping member in the said one transverse direction and toward said other tong element.

3. In a grasping and lifting device, means forming a pair of hinged together tong elements, means connected between said elements for biasing said elements toward each other, a combined spreading and clamping member extending transversely between said tong elements, cam means on one of said tong elements acting against said spreading and clamping member for drawing said spreading and clamping member toward said one of said tong elements, said spreading and clamping member extending loosely through and beyond the other tong element, said spreading and clamping member having ratchet teeth on the lower edge thereof for engagement with said other tong element when said spreading and clamping member is urged downwardly, said spreading and clamping member when lifted acting upwardly and outwardly against said other tong element to cam said tong elements apart, means acting between said spreading and clamping member and one of said tong elements to urge said spreading and clamping member downwardly and toward said other tong element and into firm engagement with said cam means, stop means on said tong elements for engagement with the top surface of an object between said tong elements, and a pair of stop means on said spreading and clamping member for limiting movement of said member relative to said other tong element.

4. In a grasping and lifting device, means forming a pair of hinged together tong elements, means connected between said elements for biasing said elements toward each other, a clamping member extending transversely between said tong elements, said clamping member being attached to one of said tong elements, said clamping member extending beyond the other tong element, said clamping member having ratchet teeth on one edge thereof for engagement with said other tong element when said clamping member is urged in one transverse direction, means acting between said clamping member and one of said tong elements to urge said clamping member in said one transverse direction, and means operating between said clamping member and one of said tong elements after one of said teeth has engaged said other tong element for causing said clamping member to draw the free ends of said tong elements toward each other.

References Cited in the file of this patent

UNITED STATES PATENTS 2,511,142    Zwoboda et al. _____ June 13, 1950